July 2, 1929.  E. WELLS  1,718,992
HOG RING
Filed July 14, 1927

Inventor
Edgar Wells
By Clarence A. O'Brien
Attorney

Patented July 2, 1929.

1,718,992

UNITED STATES PATENT OFFICE.

EDGAR WELLS, OF NORBORNE, MISSOURI.

HOG RING.

Application filed July 14, 1927. Serial No. 205,625.

This invention relates to hog rings of a type adapted to be inserted in the nose of the hog and adapted to restrain the rooting actions of the animal. The invention has for its principal object to provide a device of this character which may be firmly secured in position in such a manner as to preclude the possibility of displacement, and having an outwardly disposed extension formed therein preventing the animal from using its snout for rooting purposes, but without giving the animal discomfort when properly feeding.

A further object of the device is to provide it of simple and practical construction, reliable and effective in performance, inexpensive to manufacture, adapted to be easily and quickly installed and removed from the animal and otherwise well adapted for the purposes intended.

Other objects and advantages of the invention will become apparent from the following description when taken in connection with the accompanying drawing.

In the accompanying drawing wherein like references indicate corresponding parts throughout the several views.

Figure 1:
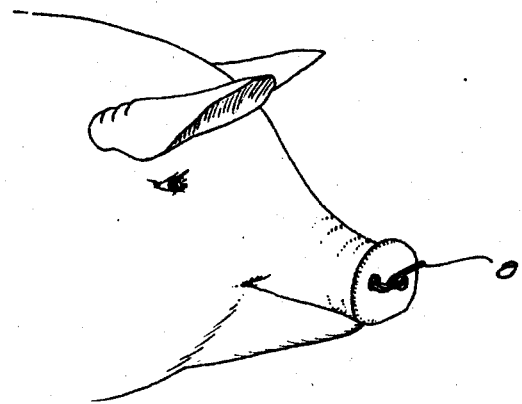
Figure 1 is a perspective view of the snout of an animal having my invention applied thereto.
Figure 2:
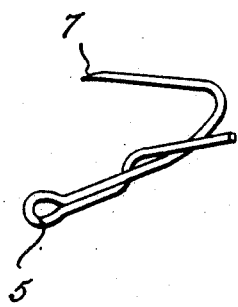
Figure 2 is a perspective view of the device in open position.
Figure 3:
Figure 3 is a similar view showing the same in its closed position.

In the drawing wherein for the purpose of illustration I have disclosed the preferred embodiment of my invention, I provide a hog ring formed of a single strand of wire, which as shown in Figures 2 and 3 of the drawing is bent to form an eye 5 intermediate its ends with the two ends of the wire extending therefrom for a short distance in parallel relation and in curved formation, one of the ends of said wire being formed into a pin 6 having a relatively sharpened point 7, said pin being bent backwardly at a sharp angle with the point extending in a direction toward the eye and adapted to be snapped into position therein so as to secure the pin in locked position.

The other end of the wire is bent inwardly and over the top of said first named end thereof, to form a prong 8 extending substantially at right angles to the pin 6. If desired, the prong 8 may be inclined upwardly at a slight angle as shown in Figure 3.

In attaching the ring, the pin 6 is inserted in one of the nostrils of the animal and forced transversely through the partition of the nose between the nostrils into the opposite nostril where the same is made by the eye 5. The ring is thus secured in a permanent position to the animal, which after the first insertion of the pin causes no discomfort to the animal and does not interfere with its breathing.

The outwardly extending prong 8 effectively prevents the animal from rooting with its nose as the same prevents the animal engaging an object with its snout.

It is obvious that I have shown the preferred embodiment of the invention, but it is to be understood that various changes in the size, shape and arrangement of parts may be resorted to without departing from the spirit of the invention and the scope of the appended claim.

Having thus described the invention, what I claim as new is:—

A nose ring formed of a single strand of wire having an eye arranged intermediate its ends with the section of each end of the eye adjacent the wire being disposed in parallel relation, one end of the wire being curved in a semi-circular formation and terminating in a pin having its extremities releasably engageable with the eye and adapted to be inserted in the nose of an animal, the other end of the wire extending transversely over the semi-circular portion of the first named end thereof and outwardly therefrom and terminating in a prong disposed substantially at right angles thereto.

In testimony whereof I affix my signature.

EDGAR WELLS.